United States Patent
Ebert

(10) Patent No.: US 9,168,853 B2
(45) Date of Patent: Oct. 27, 2015

(54) CAR SEAT CONTROL ASSEMBLY

(71) Applicant: GM GLOBAL TECHNOLOGY OPERATIONS LLC, Detroit, MI (US)

(72) Inventor: Jasmin Ebert, Mainz (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/185,560

(22) Filed: Feb. 20, 2014

(65) Prior Publication Data

US 2014/0232148 A1    Aug. 21, 2014

(30) Foreign Application Priority Data

Feb. 21, 2013   (DE) .......................... 10 2013 002 915

(51) Int. Cl.
| | | |
|---|---|---|
| *B60N 2/42* | (2006.01) | |
| *B60N 2/66* | (2006.01) | |
| *B60N 2/56* | (2006.01) | |
| *B60N 2/44* | (2006.01) | |
| *B60N 2/02* | (2006.01) | |

(52) U.S. Cl.
CPC ............ *B60N 2/5678* (2013.01); *B60N 2/0224* (2013.01); *B60N 2/44* (2013.01); *B60N 2/66* (2013.01); *B60N 2002/0264* (2013.01)

(58) Field of Classification Search
CPC .......... B60N 2/44; B60N 2/66; B60N 2/5678; A47C 7/72; B60F 19/00
USPC .......... 701/36, 49; 297/180.12, 180.14, 463.1
See application file for complete search history.

(56) References Cited

U.S. PATENT DOCUMENTS

| | | | | |
|---|---|---|---|---|
| 5,508,689 | A * | 4/1996 | Rado et al. ..................... | 340/3.1 |
| 6,523,417 | B1 * | 2/2003 | Donahue et al. ................ | 73/800 |
| 8,170,744 | B2 * | 5/2012 | Nagasawa et al. .............. | 701/36 |
| 8,190,274 | B2 * | 5/2012 | Konieczny et al. ............. | 700/17 |
| 8,237,389 | B2 * | 8/2012 | Fitch et al. ..................... | 318/563 |
| 8,457,849 | B2 * | 6/2013 | Mair ............................... | 701/65 |
| 2003/0023363 | A1 * | 1/2003 | Katz et al. ...................... | 701/49 |

FOREIGN PATENT DOCUMENTS

| | | |
|---|---|---|
| DE | 4392671 C2 | 6/2000 |
| DE | 19915294 A1 | 10/2000 |
| DE | 10040238 A1 | 3/2002 |
| DE | 102004013486 A1 | 1/2005 |
| WO | 2005088015 A1 | 9/2005 |

* cited by examiner

*Primary Examiner* — Tan Q Nguyen
(74) *Attorney, Agent, or Firm* — Ingrassia Fisher & Lorenz PC

(57) ABSTRACT

The present disclosure relates to car seat control assembly having a car seat control module installable in a motor car seat and a cable set for components of the seat. The car seat control module is non-separably connected with the cables of the cable set. Each of the respective cables has a plug connector for connection to the component associated with the cable on a terminal end opposite the car seat control module. In this arrangement, the assembly requires minimal packaging space enabling the arrangement to be installed in the motor car seat in a quick and simple manner, for a secure connection between car seat control module and components of the seat.

6 Claims, 1 Drawing Sheet

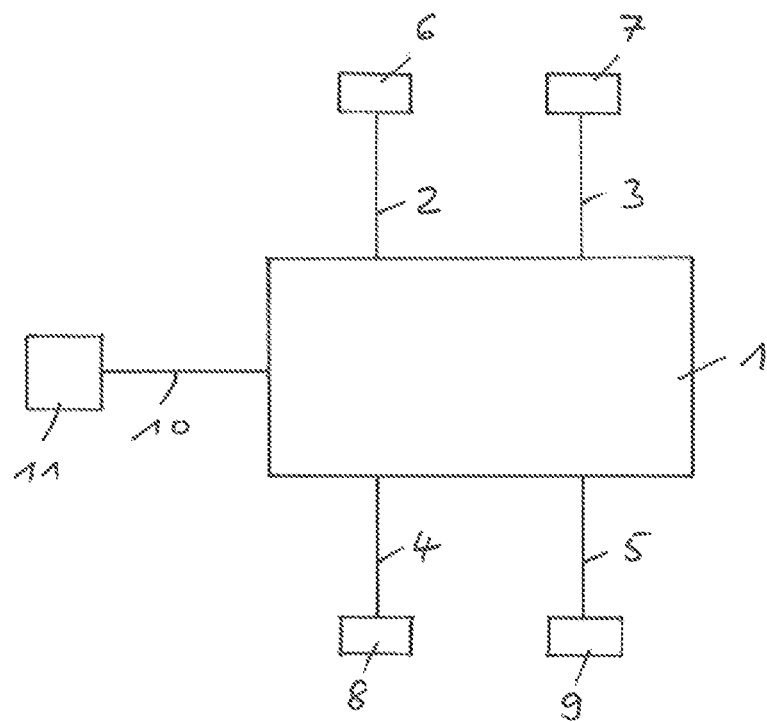

CAR SEAT CONTROL ASSEMBLY

CROSS REFERENCE TO RELATED APPLICATION

This application claims priority to German Patent Application No. 10 2013 002915.5, filed Feb. 21, 2013, which is incorporated herein by reference in its entirety.

TECHNICAL FIELD

The present disclosure relates to an arrangement for a car seat control module installable in a motor car seat and a cable set for components of the seat.

BACKGROUND

An arrangement for a car seat control module installable in a motor car seat and a cable set for components of the seat is known from practice. With this arrangement the cables of the cable set are connected with the car seat control module via plug connectors, and the cables are further connected with the components of the car seat via plug connectors in the area of their ends facing away from the car seat control module.

SUMMARY

The present disclosure further develops an arrangement of a car seat control module installable in a motor car seat and a cable set for components of the seat in such a way as to markedly reduce the space requirement of the arrangement and to enable installation of the arrangement of the motor car seat to be completed in a quick and simple manner, for a secure connection of the car seat control module and components of the car set.

According to the present disclosure a car seat control assembly is provided which includes a car seat control module installable in the motor car seat and a cable set for components of the car seat. The car seat control module is non-separably connected at one terminal end of the cables of the cable set. The other terminal end of the respective cables opposite the car seat control module include a plug connector for connection with respective components associated with the cable.

With the arrangement according to the present disclosure the cable set for the components of the seat therefore have a small number of plug connections. Accordingly there are no plug connectors provided in the connection area of the cables and the car seat control module. Rather the car seat control module is non-separably connected with the cables of the cable set. In particular the respective cable is soldered or otherwise permanently affixed to the car seat control module. In this way the car seat control module becomes a non-separable component of the seat. Seats requiring a car seat control module such as memorized seats, therefore include an integrated car seat control module including respective direct plug connectors for the components to be controlled.

This configuration of the arrangement results in a small space requirement because no space is needed for additional plug connectors. Furthermore manufacturing costs, as well as the installation time needed for installing the arrangement, are reduced. In addition the plug-less connection of the cable set with the car seat control module means that there are no inadequate plug connections, which otherwise would have to be present if the cable set had been configured with plug connectors for connection to the car seat control module.

The respective components of the seat may be designed in various ways. As such the respective component may, e.g., be an electric motor, an electric switch, an electric heating mat, an electric fan or an electrically driven pneumatic pump for inflating a seat support part, in particular a lumbar support. The respective component is connected to the car seat control module by connecting the plug connector of the cable set associated with the component, with this component.

According to a further development of the present disclosure provision is made for the car seat control module to comprise a connection for reading the car seat control module. Of particular importance is an additional easy-to-access plug connector once the arrangement is installed in the motor car seat, in order to perform a simple fault diagnosis without having to attach to the car seat control module which in an installed condition would be difficult to access.

In particular this connection for reading the car seat control module is configured such that it includes a cable which is non-separably connected with the car seat control module. The terminal end of this cable opposite the car seat control module includes a plug connector for connection to the reading device.

BRIEF DESCRIPTION OF THE DRAWINGS

The present disclosure will hereinafter be described in conjunction with the following drawing FIGURE, wherein like numerals denote like elements, and:

FIG. 1 shows a simplified representation of a car seat control assembly having a car seat control module installable in a motor car seat and a cable set for components of the seat.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

FIG. 1 shows a car seat control module 1 installable in a motor car seat not shown and a cable set for components of the seat. The cable set includes four cables 2, 3, 4 and 5. These cables are non-separably welded, soldered or otherwise permanently affixed at one terminal end to the car seat control module 1. The cables are thus not connected to the car seat control module 1 via a plug connection. Each of the cables 2, 3, 4 and 5 include a plug connector 6, 7, 8 or 9, respectively at the other terminal end opposite the car seat control module 1. The respective plug connectors 6, 7, 8 or 9 are used for connection to a component associated with the respective cable 2, 3, 4 or 5. More specifically, the plug connector 6 is used for connection to an electric motor for adjusting the motor car seat; the plug connector 7 is used for connection to an electric heating mat of the motor car seat; the plug connector 8 is used for connection to an electric fan of the motor car seat; and the plug connector 9 is used for connection to an electrically driven pneumatic pump for inflating a seat support part, such as a lumbar support.

The car seat control module 1 further includes comprises a connection for reading the car seat control module 1. More specifically, the connection includes a cable 10 which is non-separably welded, soldered or otherwise permanently affixed to the car seat control module 1 and forms a component part of the cable set. The end of the cable 10 opposite the car seat control module 1 receives a plug connector 11 for connection to a reading device. The plug connector 11 is preferably arranged in an easily accessible area of the motor car seat. The plug connector 11 is thus positioned so as to be easily accessible after installation, instead of having to attach to the difficult-to-access car seat control module 1 usually arranged in the area of the underside of the motor car seat.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A car seat control assembly comprising:
a car seat control module installable in a motor car seat and operable for controlling components in a seat, wherein the respective components are selected from the group comprising an electric motor, an electric switch an electric heating mat, an electric fan, an electrically driven pneumatic pump or combinations thereof; and
a cable set including a plurality of wires adapted to be operably connected to a respective component of the seat, the plurality of wires having a first terminal end and a second terminal end with at least one plug connector connectable to the respective component;
wherein the cable set is permanently affixed to the car seat control module at the first terminal end of the plurality of wires and the plug connectors are located at the second terminal end opposite the car seat control module.

2. The car seat control assembly according to claim 1, wherein the each of the plurality of wires of the cable set are permanently affixed to the car seat control module by welding so as to form a non-separable connection therebetween.

3. The car seat control assembly according to claim 1, wherein the each of the plurality of wires of the cable set are permanently affixed to the car seat control module by soldering so as to form a non-separable connection therebetween.

4. The car seat control assembly according to claim 1 wherein the car seat control module further comprises a connection for reading the car seat control module.

5. The car seat control assembly according to claim 4, wherein the cable set further comprises a connector wire such that the cable set including the connector wire is permanently affixed to the car seat control module at the first terminal end of the connector wire, and a plug connectors located at a second terminal end of the connector wire opposite the car seat control module for connection to a reading device.

6. The car seat control assembly according to claim 5, wherein the plug connector for connection to the reading device is arranged for easy access when the car seat control module is installed in a car seat.

\* \* \* \* \*